United States Patent [19]

Kuroda

[11] Patent Number: 5,140,810
[45] Date of Patent: Aug. 25, 1992

[54] METHOD OF DETECTING FAILURE IN A SECONDARY AIR SUPPLY SYSTEM FOR INTERNAL COMBUSTION ENGINES

[75] Inventor: Shigetaka Kuroda, Wako, Japan

[73] Assignee: Honda Giken Kogyo K.K., Tokyo, Japan

[21] Appl. No.: 747,310

[22] Filed: Aug. 19, 1991

[30] Foreign Application Priority Data

Aug. 28, 1990 [JP] Japan .................. 2-226249

[51] Int. Cl.$^5$ .............................................. F01N 3/22
[52] U.S. Cl. ......................................... 60/274; 60/276; 60/277; 60/290
[58] Field of Search ................. 60/274, 276, 277, 285, 60/287, 289, 290

[56] References Cited

U.S. PATENT DOCUMENTS

| | | | |
|---|---|---|---|
| 4,383,408 | 5/1983 | Ujihashi et al. | 60/274 |
| 4,450,680 | 5/1984 | Otsuka et al. | 60/274 |
| 5,060,474 | 10/1991 | Aramaki | 60/277 |

*Primary Examiner*—Ira S. Lazarus
*Assistant Examiner*—L. Heyman
*Attorney, Agent, or Firm*—Arthur L. Lessler

[57] ABSTRACT

A method of detecting failure in a secondary air supply system for an internal combustion engine comprises the steps of (1) causing the secondary air supply system to operate when the engine is in a predetermined decelerating condition, (2) detecting a first value of concentration of an exhaust gas ingredient, from an output from a first exhaust gas ingredient concentration sensor arranged in the exhaust passage at a location upstream of the secondary air supply system when the engine is in the predetermined decelerating condition, (3) detecting a second value of concentration of the exhaust gas ingredient, from an output from a second exhaust gas ingredient concentration sensor arranged in the exhaust passage at a location downstream of the secondary air supply system when the engine is in the predetermined decelerating condition, (4) determining whether or not the first value of concentration of the exhaust gas ingredient is lower than a first predetermined value, (5) determining whether or not the second value of concentration of the exhaust gas ingredient is lower than the first predetermined value, and (6) determining that there is failure in the secondary air supply system when it is determined that the first and second values of concentration of the exhaust gas ingredient are both lower than the first predetermined value.

10 Claims, 6 Drawing Sheets

METHOD OF DETECTING FAILURE IN A SECONDARY AIR SUPPLY SYSTEM FOR INTERNAL COMBUSTION ENGINES

BACKGROUND OF THE INVENTION

This invention relates to a secondary air supply system which is provided in an exhaust system of an internal combustion engine at a location upstream of a three-way catalyst for supplying secondary air into the exhaust system to thereby enhance the purifying efficiency of the three-way catalyst.

Conventionally, a failure detection system for a secondary an supply system of this kind has been proposed e.g. by Japanese Provisional Patent Publication (Kokai) No. 63-111256, which is provided for an internal combustion engine having an exhaust passage, and the secondary air supply system, an air-fuel ratio sensor, and a catalyst, which are arranged in the exhaust passage in the order mentioned as taken from the upstream side toward the downstream side. According to the failure detection system, when the engine is in a particular operating condition in which the secondary air supply system should be operated to supply secondary air into the exhaust passage, i.e. when the engine is idling or decelerating, if the concentration of oxygen remaining in exhaust gases in the vicinity of the air-fuel ratio sensor, which is detected by the sensor, is low (i.e. the air-fuel ratio is rich), it is determined that there is abnormality in the secondary air supply system, such as clogging thereof, which causes shortage in the supply of oxygen into the exhaust passage.

In order to positively determine abnormality of the secondary air supply system by the above proposed failure detection system, it is prerequisite that a rich air-fuel mixture should be supplied to the engine. However, in actuality, when the engine is in such a particular operating condition, the air-fuel mixture is not necessarily rich. More specifically, particularly when the engine is decelerating, the supply of fuel is normally interrupted (fuel cut), so that only fuel adhering to the inner wall surfaces of the intake pipe etc. is supplied to the cylinders, and hence combustion of fuel (explosion) in the cylinders does not necessarily take place. If the combustion does not occur, the concentration of oxygen remaining in the resulting exhaust gases (which correspond to exhaust gases produced by combustion of a lean air-fuel mixture) becomes high. In such a case, even if the secondary air supply system suffers from abnormality which prevents secondary air from being supplied into the exhaust passage, it can be determined that the secondary air supply system is normally functioning.

Another system for detecting failure in a secondary air supply system has been proposed by Japanese Provisional Patent Publication (Kokai) No. 63-212750, which determines that there occurs abnormality in the secondary air supply system (e.g. the valve of the system is held open), if an $O_2$ sensor disposed in the exhaust system at a location downstream of the secondary air supply system continually detects a lean mixture over a predetermined time period when the engine is in a high-load increased-fuel-supply operating condition in which secondary air is not supplied to the exhaust passage.

According to this conventional system, insufficient oxygen supply is not detected but excessive oxygen supply is detected to thereby determine abnormality in the secondary air supply system, which may be caused by the faulty valve which is held open. Therefore, even if the secondary air supply system is faulty due to failure of the valve to open, the failure detection system cannot determine that the secondary air supply system is faulty, which can result in an abnormal rise in the catalyst temperature and hence degradation of the catalyst operation.

SUMMARY OF THE INVENTION

It is an object of the invention to provide a method of detecting failure in a secondary air supply system for an internal combustion engine, which enables to accurately and positively detect failure in the secondary air supply system when the engine is decelerating.

It is a further object of the invention to prevent erroneous detection of failure in the secondary air supply system due to the presence of residual fuel in the exhaust passage.

To attain the above objects, the present invention provides a method of detecting failure in a secondary air supply system for an internal combustion engine including an exhaust passage in which the secondary air supply system is arranged for supplying secondary air thereinto, a first exhaust gas ingredient concentration sensor, and a second exhaust gas ingredient concentration sensor, the first exhaust gas ingredient concentration sensor being arranged in the exhaust passage at locations upstream and downstream of the secondary air supply system, respectively.

The method according to the invention is characterized by comprising the steps of:

(1) causing the secondary air supply system to operate when the engine is in a predetermined decelerating condition;

(2) detecting a first value of concentration of an exhaust gas ingredient, from an output from the first exhaust gas ingredient concentration sensor when the engine is in the predetermined decelerating condition;

(3) detecting a second value of concentration of the exhaust gas ingredient, from an output from the second exhaust gas ingredient concentration sensor when the engine is in the predetermined decelerating condition;

(4) determining whether or not the first value of concentration of the exhaust gas ingredient is lower than a first predetermined value;

(5) determining whether or not the second value of concentration of the exhaust gas ingredient is lower than the first predetermined value; and (6) determining that there is failure in the secondary air supply system when it is determined that the first and second values of concentration of the exhaust gas ingredient are both lower than the first predetermined value.

Preferably, the engine includes a catalyst arranged in the exhaust passage at a location downstream of the secondary air supply system, the second exhaust gas ingredient sensor being arranged at a location downstream of the catalyst.

For example, the predetermined decelerating condition is a condition in which a throttle valve assumes a value of opening thereof smaller than a predetermined value.

Preferably, the determinations at the steps (4) and (5) are carried out after a second predetermined time period has elapsed after the throttle valve first assumed a value of opening thereof smaller than the predetermined value.

Especially to attain the second object, the method includes the step of carrying out determination of failure in the secondary air supply system by the use of a third value of concentration of the exhaust gas ingredient detected from the output from the second exhaust gas ingredient concentration sensor immediately before the secondary air supply system is caused to operate at the step (1) when the engine is in the predetermined decelerating condition.

More specifically, it is determined that there is failure in the secondary air supply system when the first and second values of concentration of the exhaust gas ingredient have continued to be smaller than the first predetermined value, when the third value of concentration of the exhaust gas ingredient is lower than a second predetermined value.

On the other hand, it is immediately determined that there is failure in the secondary air system when the first and second values of concentration of the exhaust gas ingredient are smaller than the first predetermined value, when the third value of concentration of the exhaust gas ingredient is equal to or higher than a second predetermined value.

Preferably, the method includes the step of supplying fuel to the engine in an amount which makes rich the air-fuel ratio of a mixture supplied to the engine, when the secondary air supply system is caused to operate at the step (1), and and the steps (2)-(6) are carried out when the air-fuel ratio is thus rich.

The above and other objects, features, and advantages of the invention will become more apparent from the ensuing detailed description taken in conjunction with the accompanying drawings.

DETAILED DESCRIPTION

The invention will now be described in detail with reference to the drawings showing an embodiment thereof.

Figure 1:
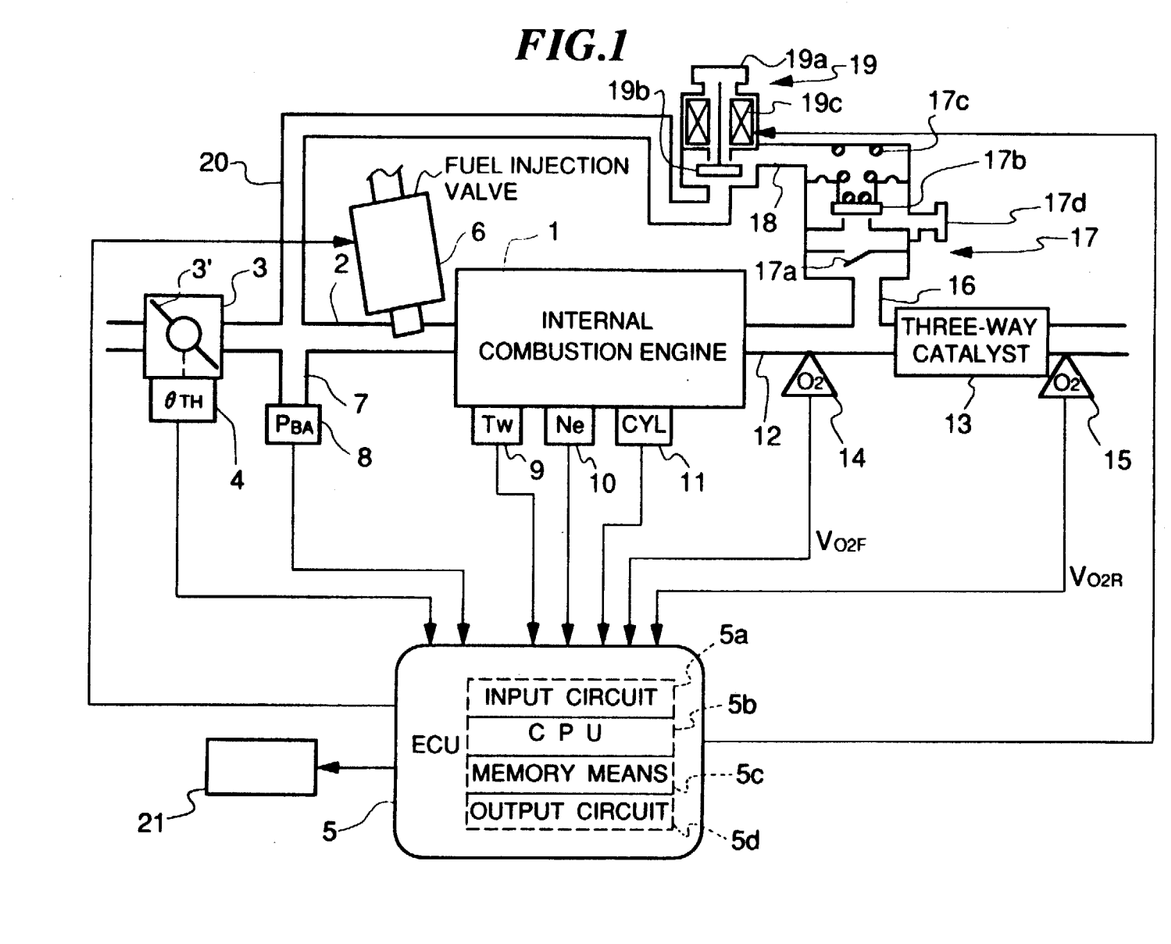
FIG. 1 is a block diagram illustrating the whole arrangement of a fuel supply control system for an internal combustion engine including a secondary air supply system to which is applied the method according to the invention.

Referring first to FIG. 1, there is shown the whole arrangement of a fuel supply control system for an internal combustion engine including a secondary air supply system to which is applied the method according to the invention. In the figure, reference numeral 1 designates an internal combustion engine. Connected to the cylinder block of the engine 1 is an intake pipe 2 across which is arranged a throttle body 3 accommodating a throttle valve 3' therein. A throttle valve opening ($\theta_{TH}$) sensor 4 is connected to the throttle valve 3' for generating an electric signal indicative of the sensed throttle valve opening and supplying same to an electronic control unit (hereinafter called "the ECU") 5.

Fuel injection valves 6, only one of which is shown, are inserted into the interior of the intake pipe at locations intermediate between the cylinder block of the engine 1 and the throttle valve 3' and slightly upstream of respective intake valves, not shown. The fuel injection valves 6 are connected to a fuel pump, not shown, and electrically connected to the ECU 5 to have their valve opening periods controlled by signals therefrom.

On the other hand, an intake pipe absolute pressure ($P_{BA}$) sensor 8 is provided in communication with the interior of the intake pipe 2 at a location immediately downstream of the throttle valve 3' for supplying an electric signal indicative of the sensed absolute pressure within the intake pipe 2 to the ECU 5.

An engine coolant temperature ($T_W$) sensor 9, which may be formed of a thermistor or the like, is mounted in the cylinder block of the engine 1, for supplying an electric signal indicative of the sensed engine coolant temperature $T_W$ to the ECU 5. An engine rotational speed (Ne) sensor 10 and a cylinder-discriminating (CYL) sensor 11 are arranged in facing relation to a camshaft or a crankshaft of the engine 1, neither of which is shown. The engine rotational speed sensor 10 generates a pulse as a TDC signal pulse at each of predetermined crank angles whenever the crankshaft rotates through 180 degrees, while the cylinder-discriminating sensor 11 generates a pulse at a predetermined crank angle of a particular cylinder of the engine, both of the pulses being supplied to the ECU 5. The ECU 5 calculates engine rotational speed Ne based on the TDC signal pulses supplied from the Ne sensor.

A three-way catalyst 13 is arranged within an exhaust pipe 12 connected to the cylinder block of the engine for purifying noxious components such as HC, CO, and NOx. $O_2$ sensors 14, 15 as exhaust gas ingredient concentration sensors are mounted in the exhaust pipe 12 at locations upstream and downstream of the three-way catalyst 13, respectively, for sensing the concentration of oxygen present in exhaust gases emitted from the engine 1 and supplying electric signals corresponding to outputs $V_{O2F}$, $V_{O2R}$ therefrom indicative of the sensed oxygen concentration to the ECU.

Further, a secondary air supply valve 17, which forms part of the secondary air supply system, is connected by way of a conduit 16 to the exhaust pipe at a location downstream of the $O_2$ sensor 14 on the upstream side and upstream of the three-way catalyst 13. The secondary air supply valve 17 comprises a normally-closed reed 17a for allowing the conduit 16 to be connected to or disconnected from the atmosphere via an air cleaner 17d, a diaphragm valve 17b which is disposed upstream of the reed 17a for allowing the conduit 16 to be connected to or disconnected from the atmosphere, and a spring 17c urging the diaphragm valve 17b in a valve-closing direction. The secondary air supply valve 17 is on one hand connected to the exhaust pipe 12 via the conduit 16 and on the other hand to a reed air-cut valve 19 (forming part of the secondary air supply system) via a conduit 18, and further to the intake pipe 2 at a location downstream of the throttle body 3 via a conduit 20.

The reed air-cut valve 19 comprises an air inlet port 19a, a valve body 19b for selectively allowing the conduit 18 to be connected to the conduit 20 for supplying negative pressure to the secondary air supply valve 17 or to the air inlet port 19a for supplying atmospheric pressure to same, and a reed valve solenoid (hereinafter referred to as "the RVS") 19c which is electrically connected to the ECU 5 and energized by a control signal supplied therefrom for operating the valve body 19b.

When the RVS 19c is energized, the valve body 19b causes the conduit 20 to connect with the conduit 18, whereby negative pressure produced downstream of the throttle body 3 by rotation of the engine 1 is introduced into the secondary air supply valve 17 via the conduit 20, the reed air-cut valve 19, and the conduit 18, to cause the diaphragm valve 17b to make a backward movement against the urging force of the spring 17c. Consequently, air (secondary air) is introduced into the secondary air supply valve 17 via the air cleaner 17d, and further, when negative pressure prevails in the exhaust pipe, the secondary air introduced forces the reed 17a to open and flows into the exhaust pipe 12 via the conduit 16. By thus introducing the secondary air into the exhaust pipe, introducing the secondary air into the exhaust pipe, the three-way catalyst 13 is exposed to an oxidizing atmosphere to thereby effectively burn and purify HC and CO components in exhaust gases.

Further connected to the ECU 5 is a light-emitting diode 21 for warning the driver when failure in the secondary air supply system comprising the secondary air supply valve 17, reed air-cut valve 19, etc. is detected by the method described in detail hereinafter.

The ECU 5 comprises an input circuit 5a having the functions of shaping the waveforms of input signals from various sensors, shifting the voltage levels of sensor output signals to a predetermined level, converting analog signals from analog-output sensors to digital signals, and so forth, a central processing unit (hereinafter called "the CPU") 5b for executing the program for carrying out the method described in detail hereinafter, memory means 5c storing various operational programs which are executed in the CPU 5b and for storing results of calculations therefrom, etc., and an output circuit 5d which supplies driving signals to the fuel injection valves 6, RVS 19c, light-emitting diode 21, etc.

The CPU 5b operates in response to the above-mentioned signals from the sensors to determine operating conditions in which the engine 1 is operating, such as an air-fuel ratio feedback control region in which the fuel supply is controlled in response to the detected oxygen concentration in the exhaust gases, and open-loop control regions including a fuel-cut region etc., and calculates, based upon the determined operating conditions, the valve opening period or fuel injection period $T_{OUT}$ over which the fuel injection valves 6 are to be opened, by the use of the following equation in synchronism with in putting of TDC signal pulses to the ECU 5.

$$T_{OUT} = T_i \times K_{O2} \times K_{LS} \times K_1 + K_2 \quad (1)$$

where $T_i$ represents a basic value of the fuel injection period $T_{OUT}$ of the fuel injection valves 6, which is read from a Ti map set in accordance with the engine rotational speed Ne and the intake pipe absolute pressure $P_{BA}$.

$K_{O2}$ is an air-fuel ratio feedback control correction coefficient whose value is determined in response to the oxygen concentration in the exhaust gases detected by the O2 sensor 14 on the upstream side, during feedback control, while it is set to respective predetermined appropriate values while the engine is in predetermined operating regions (the open-loop control regions) other than the feedback control region. In addition, the manner of setting the correction coefficient $K_{O2}$ based on the output voltage of an O2 sensor is disclosed in detail e.g. in Japanese Provisional Patent Publication (Kokai) No. 63-189638.

$K_{LS}$ is a learning coefficient which is set to a value smaller than 1.0 when the engine is in a low load operating region (open loop control region) or when it is in a decelerating region (open loop control region) in which the failure detection according to the invention is being carried out.

$K_1$ and $K_2$ are other correction coefficients and correction variables, respectively, which are calculated based on various engine parameter signals to such values as to optimize characteristics of the engine such as fuel consumption and engine driveability, depending on operating conditions of the engine.

The CPU 5b supplies through the output circuit 5d, the fuel injection valves 6 with driving signals corresponding to the calculated fuel injection period $T_{OUT}$ determined as above, over which the fuel injection valves 6 are opened.

Figure 2:
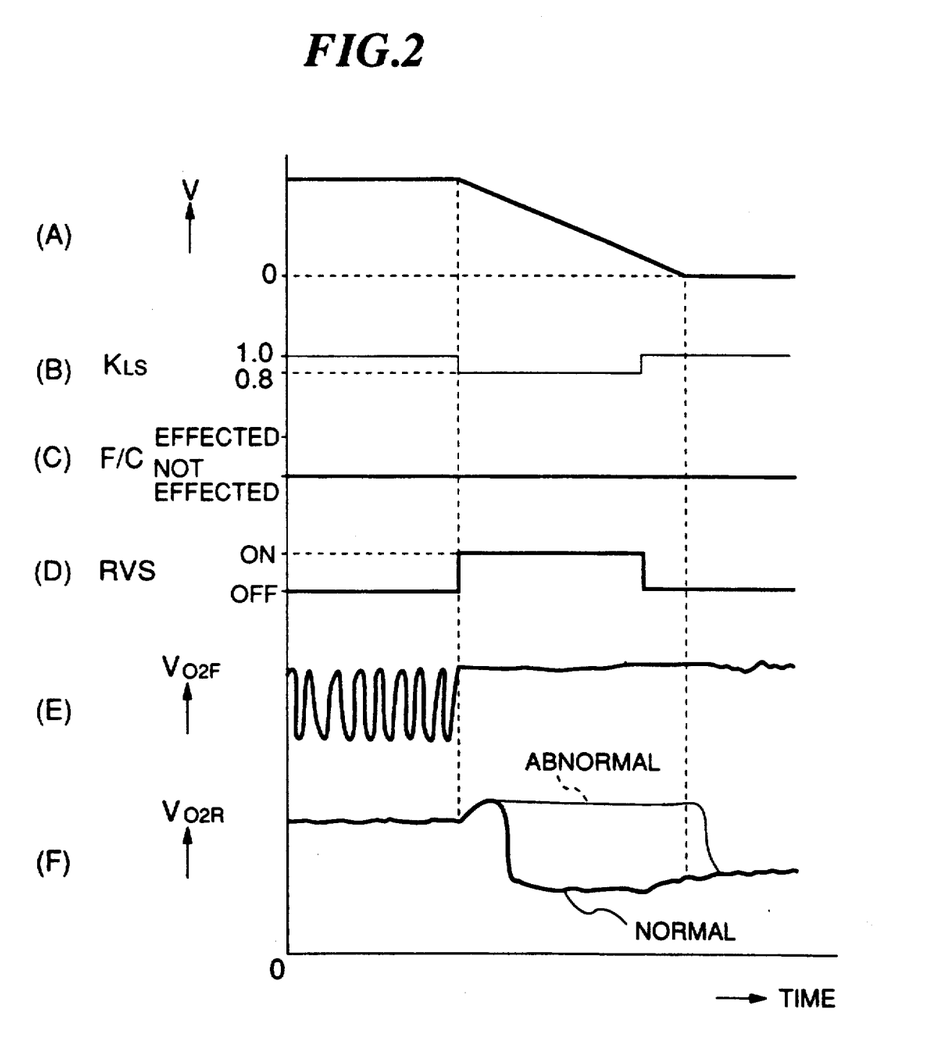
FIG. 2 is a timing chart useful in explaining the outline of an embodiment of the invention.
Figure 3A:
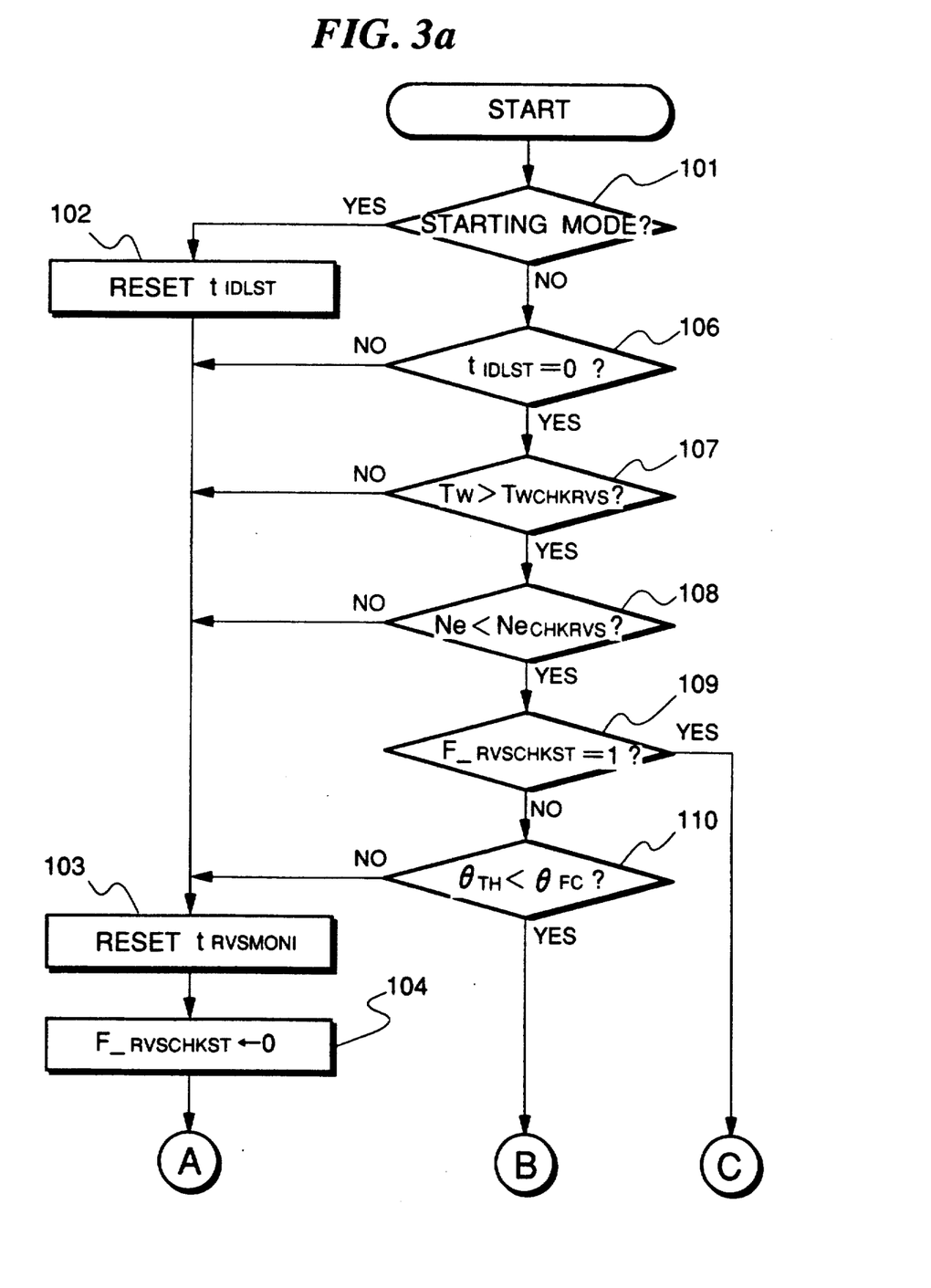
FIGS. 3a, 3b, 3c, and 3d show a flowchart of a program for carrying out the method according to the invention, which is executed by a CPU 5b appearing in FIG. 1.
Figure 3B:
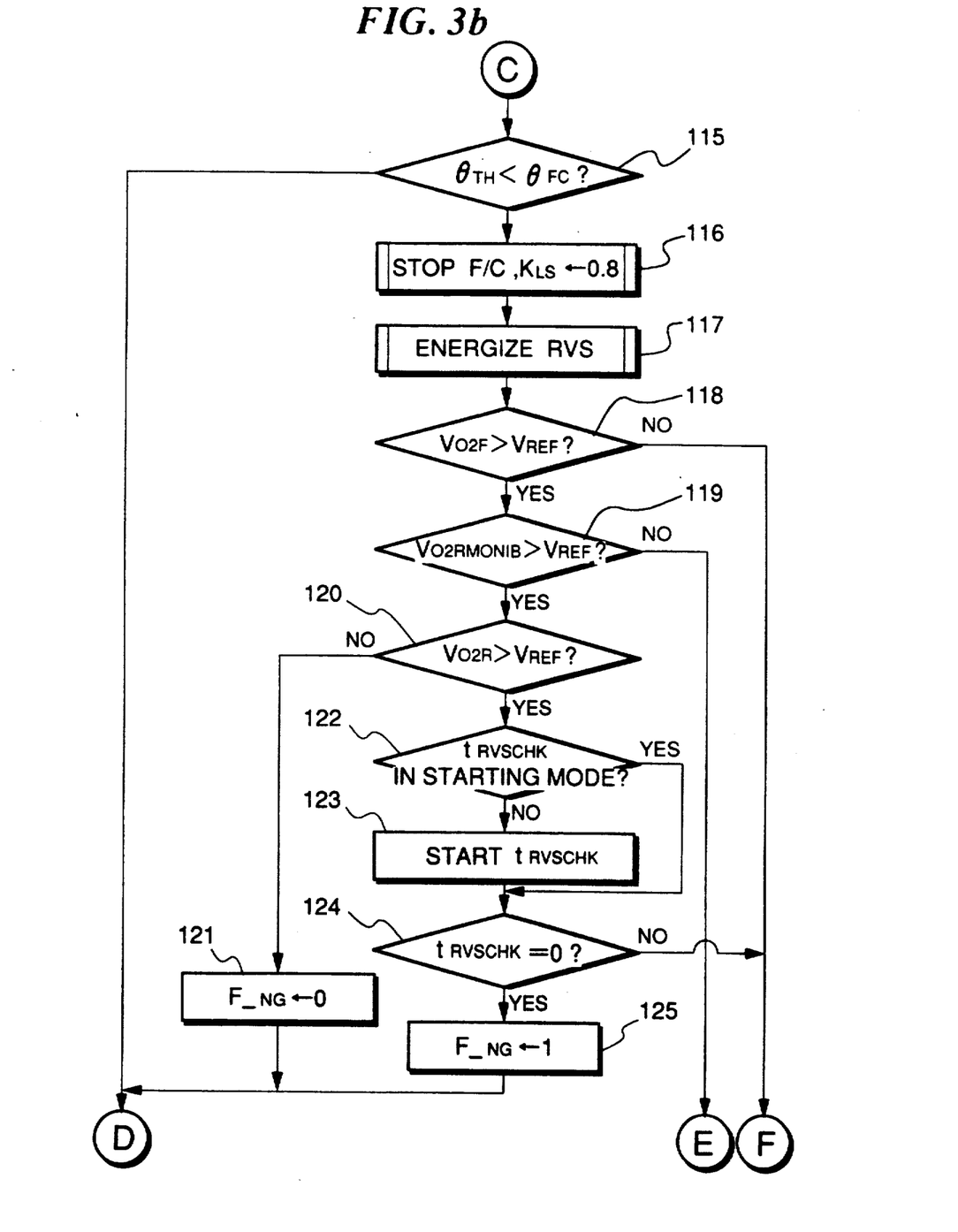
Figure 3C:
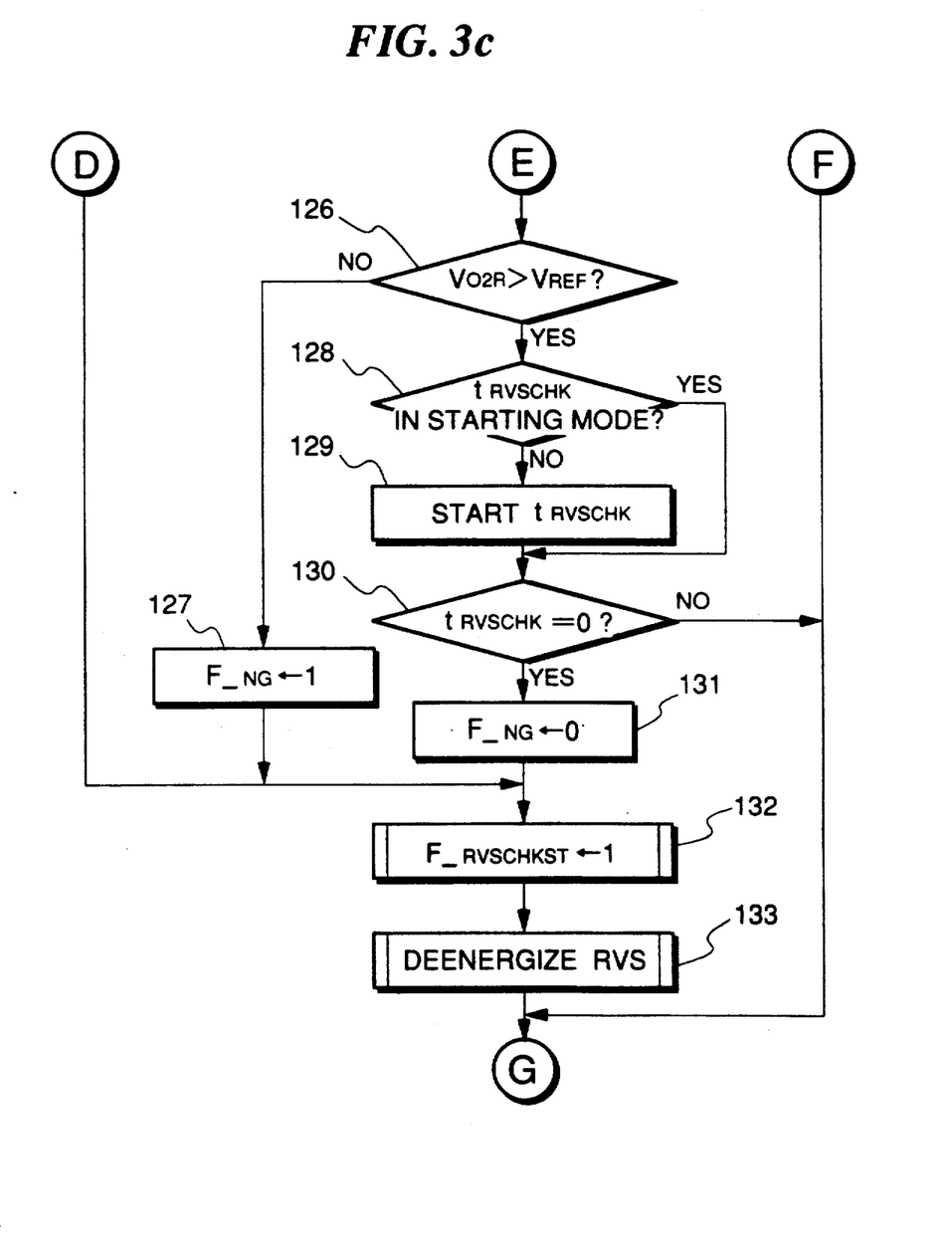
Figure 3D:
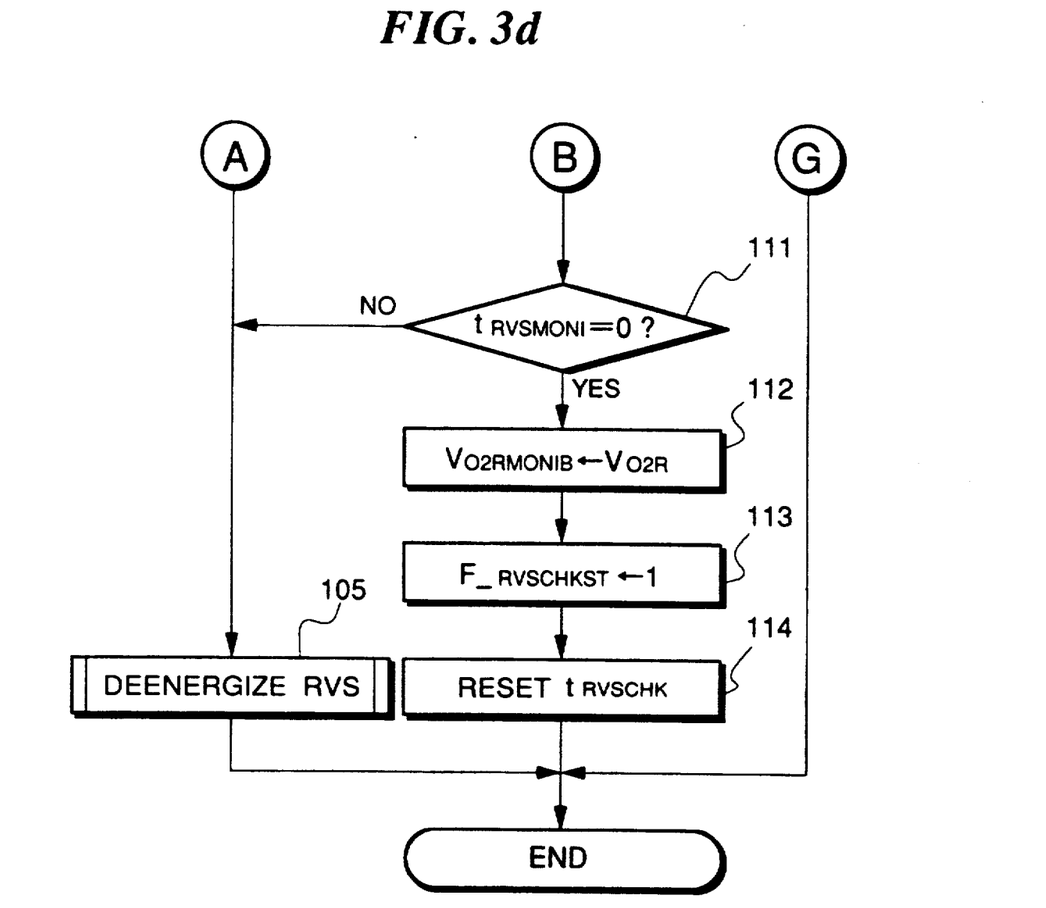

FIG. 2 shows timing of control operations and changes in related sensor output values, which is useful in explaining the outline of the embodiment of the invention. The outline of the embodiment will be described below with reference to this timing chart.

When the engine is in a predetermined decelerating condition, the travelling speed V of the vehicle decreases as shown in FIG. 2 (A). When the engine is in this predetermined decelerating condition, interruption of fuel supply (fuel cut) is normally carried out. However, when the failure detection according to the invention is carried out, the fuel cut is not carried out, but fuel supply control is carried out such that the air-fuel mixture becomes rich. More specifically, when the engine is in the above predetermined decelerating condition, the throttle valve 3' is substantially fully closed, and in such a state of air supply, in order to make the air-fuel ratio of the mixture equal to 10 (rich), it is only required to set the leaning coefficient $K_{LS}$ to 0.8 to thereby determine the fuel injection period $T_{OUT}$ [FIGS. 2 (B) and (C)].

If the secondary air is supplied to exhaust gases resulting from the thus enriched mixture by energizing the RVS 19c [FIG. 2 (D)], an output $V_{O2F}$ from the O2 sensor 14 on the upstream side indicative of the concentration of oxygen present in the exhaust gases, which is detected by the sensor 14, and an output $V_{O2R}$ from the O2 sensor 15 on the downstream side indicative of oxygen present in the exhaust gases, which is detected by the sensor 15, are obtained as shown in FIGS. 2 (E) and (F). The outputs $V_{O2F}$, $V_{O2R}$ are voltage values which are inversely proportional to values of the concentration of oxygen to be detected by the sensors, and therefore the higher the concentration of oxygen, the smaller the outputs.

As can be understood from FIG. 2 (F), when the secondary air is normally supplied, the output $V_{O2R}$ changes as indicated by the solid line in the figure. In contrast, when the secondary air supply system is not normally functioning and hence the amount of the secondary air supplied is insufficient, the output $V_{O2R}$ changes as indicated by the broken line in same. The method of the invention makes use of such a difference in $V_{O2R}$ between normal operation and abnormal operation of the secondary air supply system to carry out detection of failure in the secondary air supply system (the secondary air supply valve 17, the reed air-cut valve 19, etc.), while making sure that the mixture supplied to the engine is positively rich by monitoring whether the output $V_{O2F}$ is larger than a predetermined value.

Next, the method of detecting failure in the secondary air supply system according to the invention will be described in detail with reference to FIG. 3 showing a control program. This program is executed by the CPU 5b whenever the TDC signal pulse is supplied to the ECU 5.

First, at a step 101, it is determined whether or not the engine 1 is in a starting mode. If the answer to this question is affirmative (Yes), a $t_{IDLST}$ timer formed of a down-counter for measuring time having elapsed after the engine 1 left the starting mode is set to a predetermined time period $t_{IDLST}$ (e.g. 2 seconds) and started at a step 102. At the following step 103, a $t_{RVSMONI}$ timer formed of a down-counter for measuring time having elapsed after the engine 1 entered a decelerating condition (the answer to the question of a step 110 referred to hereinafter is affirmative) is set to a predetermined time period $t_{RVSMONI}$ (e.g. 2 seconds) and started. Further at a step 104, a flag $F_{-RVSCHKST}$ which indicates when assuming a value of 1 that the engine is in an operating condition suitable for checking the secondary air supply system is set to 0, and at a step 105, the RVS 19c is deenergized to thereby interrupt the supply of the secondary air into the exhaust pipe 12, followed by terminating the present program.

On the other hand, if the answer to the question of the step 101 is negative (No), it is determined at a step 106 whether or not the count value of the $t_{IDLST}$ timer is equal to 0. If the answer to this question is negative (No), the program proceeds to the step 103, whereas if the answer is affirmative (Yes), i.e. if the predetermined time period $t_{IDLST}$ has elapsed after the engine 1 left the starting mode and entered a normal operation mode, the program proceeds to steps 107 and 108, where it is determined whether or not the engine is in the operating condition suitable for checking the secondary air supply system.

More specifically, at the step 107, it is determined whether or not the engine coolant temperature $T_W$ is higher than a predetermined value $T_{WCHKRVS}$ (e.g. 50° C.), and at the step 108, it is determined whether or not the engine rotational speed Ne is lower than a predetermined value $Ne_{CHKRVS}$ (e.g. 4500 rpm). If either of the answers to the questions of the steps 107 and 108 is negative (No), the program proceeds to the step 103, whereas if both the answers are affirmative (Yes), the program proceeds to a step 109.

At the step 109, it is determined whether or not the flag $F_{-RVSCHKST}$ is equal to 1. Since initially the flag has been set to 0, the answer to this question is negative (No), and the program proceeds to the step 110.

At the step 110, it is determined whether or not the throttle valve opening $\theta_{TH}$ is smaller than a predetermined value $\theta_{FC}$ (e.g. 4°) at which the interruption of supply of fuel (fuel cut) should be started. If the answer to this question is negative (No), the program proceeds to the step 103, whereas if the answer is affirmative (Yes), i.e. if the engine 1 is in the decelerating condition in which the throttle valve opening $\theta_{TH}$ is smaller than the predetermined value $\theta_{FC}$, it is determined at a step 111 whether or not the count value of the $t_{RVSMONI}$ timer is equal to 0. If the answer to this question is negative (No), the program proceeds to the step 105, whereas if the answer is affirmative (Yes), i.e. if the predetermined time period $t_{RVSMONI}$ has elapsed after the engine 1 entered the decelerating condition, it is judged that the engine is the operating condition suitable for checking the secondary air supply system, and hence the program proceeds to steps 112 to 114.

At a step 112, a value of the output $V_{O2R}$ from the O2 sensor 15 on the downstream side which is generated immediately before the enriching of the mixture and the supply of the secondary air are carried out respectively at steps 116 and 117 referred to hereinafter, is stored as a pre-condition memory value $V_{O2RMONIB}$, and at a step 113, the flag $F_{-RVSCHKST}$ is set to 1. At the following step 114, a $t_{RVSCHK}$ timer formed of a down-counter for measuring time during which abnormality of the secondary air supply system continues is set to a predetermined time period $t_{RVSCHK}$ (e.g. 5 seconds) (the starting of this timer is not carried out at this step), followed by terminating the present program.

In the following loop, the answer to the question of the step 109 is affirmative (Yes), and at a step 115, a determination similar to that effected at the step 110 is carried out. If the answer to the question of the step 115 is negative (No), i.e. if the engine 1 has already left the decelerating condition, the flag $F_{-RVSCHKST}$ is set to 0 at a step 132, and the RVS 19c is deenergized at a step 133 to inhibit the supply of the secondary air into the exhaust pipe 12, followed by terminating the present program.

If the answer to the question of the step 115 is affirmative (Yes), although the fuel cut is normally carried out, in the present case, at a step 116, the leaning coefficient $K_{LS}$ is set to 0.8 (open loop control) without carrying out the fuel cut to thereby determine the fuel injection period $T_{OUT}$ by the equation (1) and drive the fuel injection valves 6 based on the determined fuel injection period $T_{OUT}$. The reason for setting the leaning coefficient $K_{LS}$ to 0.8 is that the value 0.8 is suitable for making the mixture rich to such an extent that the air-fuel ratio is 10 when the throttle valve opening $\theta_{TH}$ is smaller than the predetermined value $\theta_{FC}$.

In the following step 117, the RVS 19c is energized to supply the secondary air into the exhaust pipe 12.

By execution of the steps 116 and 117, if the secondary air supply system is normally functioning, it is assured that the concentration of oxygen (a first value of concentration of an exhaust gas ingredient) detected by the O2 sensor 14 (a first exhaust gas ingredient concentration sensor) on the upstream side assumes a lower value (the output $V_{O2F}$ assumes a larger value), whereas the concentration of oxygen (a second value of concentration of the exhaust gas ingredient) detected by the O2 sensor 15 (a second exhaust gas ingredient concentration sensor) on the downstream side assumes a higher value (the output $V_{O2R}$ assumes a smaller value), though there is some time lag. Therefore, at the following steps 118 to 131, failure detection is carried out based on values of the outputs $V_{O2F}$, $V_{O2R}$ from the respective sensors 14, 15.

First, at a step 118, it is determined whether or not the the output $V_{O2F}$ from the O2 sensor 14 on the upstream side assumes a value larger than a predetermined reference value $V_{REF}$ (whether or not the first value of concentration of the exhaust gas ingredient is lower than a first predetermined value). If the answer to this question is negative (No), it is judged that exhaust gases produced from the enriched mixture have not reached the O2 sensor 14 on the upstream side yet, and hence the conditions for checking the secondary air supply system are not satisfied, and the program is immediately terminated. On the other hand, if the answer to the question of the step 118 is affirmative (Yes), it is judged that the exhaust gases produced from the enriched mixture have already reached the $O_2$ sensor 14 on the upstream side, and hence the conditions for checking the secondary air supply system are satisfied, the program proceeds to a step 119, where it is determined whether or not the pre-condition memory value, i.e. the stored value of the output $V_{O2R}$ from the $O_2$ sensor 15 on the downstream side which was generated immediately before execution of the enriching of the mixture and the supply of the secondary air is larger than the predetermined reference value $V_{REF}$. The precondition memory value $V_{O2R-MONIB}$ may be compared with a predetermined reference value other than the predetermined reference value $V_{REF}$ (i.e. it is determined whether or not a third value of concentration of the exhaust gas ingredient is smaller than a second predetermined value).

If the answer to the question of the step 119 is affirmative (Yes), it is determined at a step 120 whether or not the output $V_{O2R}$ from the $O_2$ sensor 15 on the downstream side assumes a value larger than the predetermined reference value $V_{REF}$ (i.e. whether or not the second value of concentration of the exhaust gas ingredient is lower than the first predetermined value). If the answer to this question is negative (No), i.e. if the concentration of oxygen detected from exhaust gases in the vicinity of the $O_2$ sensor 15 on the downstream side assumed a lower value immediately before execution of the supply of the secondary air (i.e. the answer to the question of the step 119 is affirmative) and at the same time assumes a higher value immediately after execution of the supply of the secondary air (i.e. the answer to the question of the step 120 is negative), which means that the secondary air is supplied in a sufficient amount, a flag $F_{-NG}$ which indicates when assuming a value of 1 that there is failure in the secondary air supply system is set to 0 at a step 121, followed by the program proceeding to steps 132, 133. At the step 132, the flag $F_{-RVSCHKST}$ is set to 0 to provide for checking of the secondary air supply system to be carried out in the following loops, and at the step 133, the RVS 19c is deenergized to thereby interrupt the supply of the secondary air which has been effected for the purpose of checking the secondary air supply system.

On the other hand, if the answer to the question of the step 120 is affirmative (Yes), i.e. if the concentration of oxygen detected from the exhaust gases in the vicinity of the $O_2$ sensor 15 on the downstream side assumed a lower value immediately before execution of the supply of the secondary air and at the same time assumes a lower value immediately after execution of the supply of the secondary air, the lapse of the predetermined time period $t_{RVSCHK}$ is awaited by steps 122 to 124, taking into consideration the time lag occurring before the secondary air supplied reaches the vicinity of the $O_2$ sensor 15 on the downstream side and the time period over which unburnt gases stay in the exhaust pipe 12 after the start of supply of secondary air. If the output $V_{O2R}$ from the $O_2$ sensor 15 on the downstream side assumes a value larger than the predetermined reference value $V_{REF}$ (i.e. if the second value of concentration of oxygen is lower than the first predetermined value) (the answer to the question of the step 120 is affirmative) even after the lapse of the predetermined time period $t_{RVSCHK}$, it is judged that there is failure in the secondary air supply system. More specifically, it is determined at a step 122 whether or not the $t_{RVSCHK}$ timer set at the step 114 has already been started. If it has not been started yet, the $t_{RVSCHK}$ timer is started at a step 123, and then at a step 124, it is determined whether or not the count value of the $t_{RVSCHK}$ timer is equal to 0. If the answer to this question is negative (No), the present program is immediately terminated, whereas if the answer is affirmative (Yes), the flag $F_{-NG}$ is set to 1, followed by the program proceeding to the step 132.

If the answer to the question of the step 119 is affirmative (Yes), it is determined at a step 126 whether or not the output $V_{O2R}$ from the $O_2$ sensor 15 on the downstream side assumes a value larger than the predetermined reference value $V_{REF}$. If the answer to this question is affirmative (Yes), i.e. if the concentration of oxygen detected from the exhaust gases in the vicinity of the $O_2$ sensor 15 on the downstream side assumed a higher value immediately before execution of the supply of the secondary air (i.e. the answer to the question of the step 119 is negative) and at the same time assumes a lower value immediately after execution of the supply of the secondary air (i.e. the answer to the question of the step 126 is affirmative), which means that the secondary air is not actually supplied, the flag $F_{-NG}$ is set to 0 at a step 127, followed by the program proceeding to step 132.

On the other hand, if the answer to the question of the step 126 is negative (No), i.e. if the concentration of oxygen detected from the exhaust gases in the vicinity of the $O_2$ sensor 15 on the downstream side assumed a higher value immediately before execution of the supply of the secondary air and at the same time assumes a higher value immediately after execution of the supply of the secondary air, the lapse of the predetermined time period $t_{RVSCHK}$ is awaited at steps 128 to 130 in a manner similar to the steps 122 to 124. If the output $V_{O2R}$ from the $O_2$ sensor 15 on the downstream side assumes a value equal to or lower smaller than the predetermined reference value $V_{REF}$ (i.e. if the second value of concentration of oxygen is equal to or higher than the first predetermined value) (the answer to the question of the step 126 is negative) even after the lapse of the predetermined time period $t_{RVSCHK}$, it is judged that there is no failure in the secondary air supply system, and then the flag $F_{-NG}$ is set to 0 at a step 131.

In the embodiment described above, the $O_2$ sensor 15 on the downstream side is arranged in the exhaust pipe at a location downstream of the three-way catalyst 13, so that the $O_2$ sensor 15 is capable of detecting a value of the concentration of oxygen present in the exhaust gases, which is made stable and smooth in change relative to the lapse of time. However, this is not limitative, but the $O_2$ sensor 15 may be arranged in the exhaust pipe at a location downstream of the conduit 16 and upstream of the three-way catalyst 13.

Further, although, in the above described embodiment, the oxygen concentration sensors ($O_2$ sensors) are used as the exhaust gas ingredient concentration sensors, this is not limitative, but hydrocarbon (HC) concentration sensors may be used to detect failure in the secondary air supply system by detecting the concentration of another exhaust gas ingredient (HC) by the hydrocarbon (HC) concentration sensors.

What is claimed is:

1. A method of detecting failure in a secondary air supply system for an internal combustion engine including an exhaust passage in which said secondary air supply system is arranged for supplying secondary air thereinto, a first exhaust gas ingredient concentration sensor, and a second exhaust gas ingredient concentration sensor, said first exhaust gas ingredient concentration sensor and said second exhaust gas ingredient concentration sensor being arranged in said exhaust passage at locations upstream and downstream of said secondary air supply system, respectively, the method comprising the steps of:
  (1) causing said secondary air supply system to operate when said engine is in a predetermined decelerating condition;
  (2) detecting a first value of concentration of an exhaust gas ingredient, from an output from said first exhaust gas ingredient concentration sensor when said engine is in said predetermined decelerating condition;
  (3) detecting a second value of concentration of said exhaust gas ingredient, from an output from said second exhaust gas ingredient concentration sensor when said engine is in said predetermined decelerating condition;
  (4) determining whether or not said first value of concentration of said exhaust gas ingredient is lower than a first predetermined value;
  (5) determining whether or not said second value of concentration of said exhaust gas ingredient is lower than said first predetermined value; and
  (6) determining that there is failure in said secondary air supply system when it is determined that said first and second values of concentration of said exhaust gas ingredient are both lower than said first predetermined value.

2. A method according to claim 1, wherein said engine includes a catalyst arranged in said exhaust passage at a location downstream of said secondary air supply system, said second exhaust gas ingredient sensor being arranged at a location downstream of said catalyst.

3. A method according to claim 1, wherein it is finally determined that there is failure in said secondary air supply system when said first and second values of concentration of said exhaust gas ingredient have continued to be lower than said first predetermined value over a first predetermined time period.

4. A method according to claim 1, wherein said engine includes a throttle valve, and said predetermined decelerating condition is a condition in which said throttle valve assumes a value of opening thereof smaller than a predetermined value.

5. A method according to claim 4, wherein said determinations at said steps (4) and (5) are carried out after a second predetermined time period has elapsed after said throttle valve first assumed a value of opening thereof smaller than said predetermined value.

6. A method according to any one of claims 1 to 5, including the step of carrying out determination of failure in said secondary air supply system by the use of a third value of concentration of said exhaust gas ingredient detected from said output from said second exhaust gas ingredient concentration sensor immediately before said secondary air supply system is caused to operate at said step (1) when said engine is in said predetermined decelerating condition.

7. A method according to claim 6, wherein it is determined that there is failure in said secondary air supply system when said first and second values of concentration of said exhaust gas ingredient have continued to be smaller than said first predetermined value, when said third value of concentration of said exhaust gas ingredient is lower than a second predetermined value.

8. A method according to claim 6, wherein it is immediately determined that there is failure in said secondary air system when said first and second values of concentration of said exhaust gas ingredient are smaller than said first predetermined value, when said third value of concentration of said exhaust gas ingredient is equal to or higher than a second predetermined value.

9. A method according to claim 7 or 8, wherein said second predetermine value is equal to said first predetermined value.

10. A method according to claim 1, including the step of supplying fuel to said engine in an amount which makes rich the air-fuel ratio of a mixture supplied to said engine, when said secondary air supply system is caused to operate at said step (1), and wherein and said steps (2)–(6) are carried out when the air-fuel ratio is thus rich.

* * * * *